United States Patent
Lim

Patent Number: 5,492,543
Date of Patent: Feb. 20, 1996

[54] PREPARATION OF ELECTRODES AND NI/MHX ELECTROCHEMICAL STORAGE CELL

[75] Inventor: Hong S. Lim, Agoura Hills, Calif.

[73] Assignee: Hughes Aircraft Company, Los Angeles, Calif.

[21] Appl. No.: 133,702

[22] Filed: Oct. 8, 1993

[51] Int. Cl.$^6$ ................................................. H01M 4/04
[52] U.S. Cl. .................... 29/623.1; 429/101; 429/218; 420/422; 420/900; 29/623.5
[58] Field of Search .................... 429/101, 218; 420/900, 422; 29/623.1, 623.5

[56] References Cited

U.S. PATENT DOCUMENTS

| | | |
|---|---|---|
| 4,004,943 | 1/1977 | Boter . |
| 4,233,347 | 11/1980 | Lim et al. . |
| 4,269,913 | 5/1981 | Lim et al. . |
| 4,487,817 | 11/1984 | Willems et al. . |
| 4,551,400 | 11/1985 | Sapru et al. . |
| 4,637,967 | 1/1987 | Keem et al. . |
| 4,946,646 | 8/1990 | Gamo et al. . |
| 5,278,001 | 1/1994 | Ono et al. ............................ 429/101 |
| 5,281,390 | 1/1994 | Gamo et al. ......................... 420/422 |
| 5,304,345 | 4/1994 | Fujiani et al. ....................... 420/455 |
| 5,304,435 | 4/1994 | Jones ................................... 429/101 |

OTHER PUBLICATIONS

A. Anani et al., "Characterization of Sn–modified AB$_5$ alloy for hydrogen storage and battery applications," Abstract No. 64 of presentation at Fall Electrochemical Society Meeting, Oct. 11–16, 1982 (1 page).

A. Anani et al., "Mechanically alloyed hydrogen storage materials with high gas phase and electrochemical storage capacities," Abstract of presentation at Spring Electrochemical Society meeting, May 16–21, 1993 (1 page abstract).

A. Anani et al., "Mechanically alloyed hydrogen storage materials with high gas phase and electrochemical storage capacities," Extended abstract of Presentation at Spring Electrochemical Society meeting, May 16–21, 1993 (2 pages).

Konstantin Petrov, Amaldo Visintin, et al., "Optimization of composition and structure of metal hydride electrodes for electric vehicle applications," Abstract of presentation at Spring Electrochemical Society meeting, May 16–21, 1993 (1 page).

Konstantin Petrov, Amaldo Visintin, et al., "Optimization of composition and structure of metal hydride electrodes," Extended Abstract of presentation at Spring Electrochemical Society meeting, May 16–21, 1993 (2 pages).

Konstantin Petrov, Abbes Rostami, et al., "Optimization of Composition and Structure of Metal–Hydride Electrodes," preprint of paper presented at 1993 Electrochemical Society Fall Meeting, Oct. 11, 1993.

*Primary Examiner*—Prince Willis, Jr.
*Assistant Examiner*—M. Nuzzolillo
*Attorney, Agent, or Firm*—Elizabeth E. Leitereg; Terje Gudmestad; W. K. Denson-Low

[57] ABSTRACT

An electrode (40) for a Ni/MHx storage cell (47) is prepared by providing a substrate (62) and providing an active material in a finely divided form. A paste (60) of a mixture of the active material, optionally a finely divided carbon powder, and a solution of a polymer in an organic solvent is formed. The paste (60) is coated onto the substrate (62). The paste-coated substrate (62) is immersed into water to wash away the organic solvent and to precipitate the polymer, completing the anode fabrication. This electrode (40) is assembled with another electrode (44) and as a separator (46) between the electrodes (40 and 44) and provided with an electrolyte (50), to form the electrochemical cell (47).

19 Claims, 3 Drawing Sheets

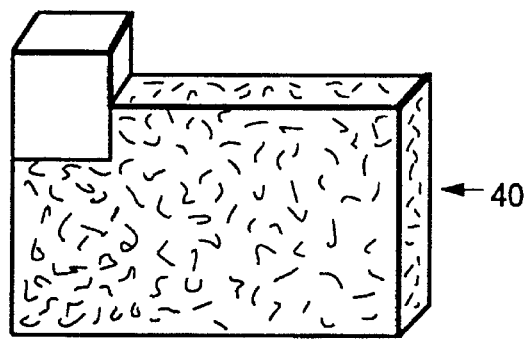
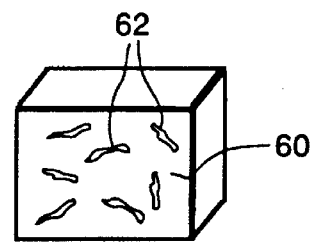
FIG. 2a.  FIG. 2b.
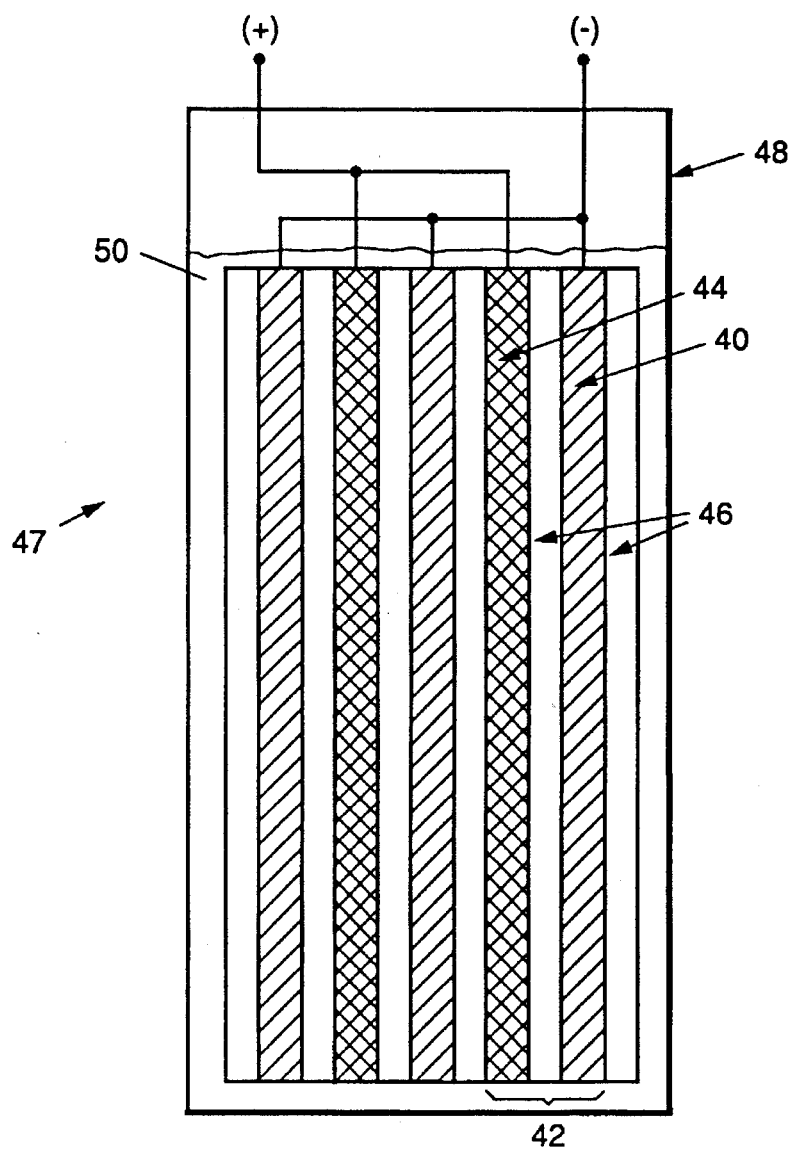
FIG. 3.

5,492,543

PREPARATION OF ELECTRODES AND NI/MHX ELECTROCHEMICAL STORAGE CELL

BACKGROUND OF THE INVENTION

This invention relates to electrochemical storage cells, and, more particularly, to the preparation of electrodes for a Ni/MHx cell and preparation of the cell itself.

Rechargeable electrochemical storage cells or batteries are electrochemical devices for storing and retaining an electrical charge and later delivering that charge as useful power. Familiar examples of the rechargeable cell are the lead-acid cell used in automobiles and the nickel-cadmium cell used in various portable electronic devices. Other types of cells having a greater storage capacity for their weight and volume include those based upon the reduction and oxidation of nickel oxide at a cathode, and the corresponding oxidation and reduction of hydrogen at an anode. Such cells are desirably used in weight-critical, long-life applications such as the batteries in spacecraft. One familiar cell based upon this electrochemistry is the nickel oxide/pressurized hydrogen cell.

Another type of cell under development is the nickel/metal hydride cell (also known generically in the art as the "Ni/MHx cell"), which has the advantage that a pressurized container is not required because the anode reaction product is a solid rather than a gas. At the anode of the nickel/metal hydride cell, a reversible electrode reduction reaction of water at the surface of a metal alloy (the "active material") produces a solid metal hydride and hydroxide ion. The metal hydride has, in general, a different volume than the corresponding metal. The anode is therefore subjected to volumetrically induced strains during charging/discharging cycles. If the anode is not properly designed and fabricated, these strains may lead to a premature failure. When the cell is utilized in a spacecraft application requiring many charging/discharging cycles and is not readily accessible for repairs, such failures can have significant adverse consequences.

It is known to fabricated the anode of a Ni/MHx electrochemical cell by mixing the finely divided hydride-forming metal powder with finely divided carbon and a polymer. The mixture is then heated to soften the polymer, and the mixture is forced into the anode substrate structure. Upon cooling, the polymer binds the metal powder and the carbon to the anode substrate. This technique has the major disadvantage that a portion of the surface area of the metal particles is blocked from access by the electrolyte. Some portion of the metal powders can be fully encapsulated by the polymer and become inaccessible for the electrochemical reaction, thereby reducing the utilization of the anode active material. Additionally, the polymer may not fully wet the anode substrate, resulting in long-term debonding of the active material and partial or total failure of the anode. Also, the polymer may not be sufficiently resilient to accommodate the volumetric changes during long-term cycling, leading to disintegration of the particle-to-particle bonding of the alloy within the anode structure.

The above discussion has focused on the anode, but there may be comparable issues associated with the cathode. Thus, there is a need for an improved approach to fabricating electrodes (anodes and cathodes) and the corresponding cell for a Ni/MHx electrochemical storage cell and other storage cells of this general type. The electrodes should be highly efficient, and also be resistant to long-term damage, as from volumetrically induced strains. The electrodes must also be stable during long-term exposure in the electrolyte. The electrodes are also desirably inexpensive to produce. The present invention fulfills this need, and further provides related advantages.

SUMMARY OF THE INVENTION

The present invention provides a method for preparing an electrode for a Ni/MHx electrochemical storage cell and other storage cells of the same general type, and the unique electrodes and cells produced by the method. The electrode is highly efficient, yet resists damage induced by the volumetric changes accompanying the chemical reactions occurring at the electrodes, through the formation of a flexible, three-dimensional polymer network structure. The electrodes are chemically stable in the alkali electrolytes used in the cell. The electrodes and thence the cell are therefore reliable in long-term uses that involve many cycles of charging and discharging. The electrodes are also relatively inexpensive to produce. Another important advantage is that the resulting cells and batteries produced by combining a number of cells have operational characteristics similar to those of nickel-cadmium (Ni/Cd) cells, which are presently widely used in portable electronic equipment. The Ni/MHx cells and batteries can therefore replace the Ni/Cd cells without changing the circuits being powered.

In accordance with the invention, a method for preparing an electrode comprises the steps of providing a substrate, preferably having a porous structure, and an active material, such as a hydride-forming metal (for an anode) or nickel oxyhydroxide/nickel hydroxide (for a cathode), in a finely divided form. A paste is prepared comprising a mixture of the active material, optionally but preferably, a finely divided electrically conductive but chemically nonreactive material, and a solution of a polymer in an organic solvent. The finely divided electrically conductive but chemically nonreactive material is preferably present, but may be omitted in some cases where the electrical conductivity of the active material is itself sufficiently great. The paste is coated onto the substrate, by impregnating the paste into the pores of the substrate in the preferred case. To complete the anode fabrication, the organic solvent is washed away from the paste and the polymer precipitated with water, leaving the polymer in position forming a flexible, porous, wettable, three-dimensional bonding structure.

In the preferred case, the electrode prepared in this manner is assembled together with a second electrode of the opposite type, which may be but is not necessarily prepared by the approach of the invention, and a suitable separator. The assembly of anode, cathode, and intermediate separator is either immersed into a suitable electrolyte to form an electrolyte-flooded electrochemical cell, or a controlled amount of the electrolyte is added to the assembly to make an electrolyte-starved sealed cell. The electrolyte is preferably a 20–40 volume percent aqueous solution of potassium hydroxide (KOH). In conventional practice, a large number of such individual cells are assembled together in the appropriate series and parallel arrangements as a battery to produce the voltage and current required for a particular application.

The electrodes prepared by the present invention and the corresponding cells are unique in that they include a porous, flexible, wettable polymeric structure that binds the active material to the electrode substrate. This structure allows full utilization of the active material in the electrochemical reaction. The polymeric material is processed by a solution technique that produces an excellent porous structure of the active material particles to hold the active material and the substrate together and to permit a high utilization of the active material. This technique provides an improved structure in comparison with the electrode structure produced by the hot melt technique, which exhibits incomplete wetting, partial blockage of the surface of the active material, or partial encapsulation of the active material. The technique is also more convenient to use than direct sintering.

The present invention thus provides an important advance in the art of the electrodes and cells. Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 2a is a perspective view of an entire electrode, depicted as an anode, prepared by the process of the invention, and FIG. 2b illustrates an enlarged portion of a region of the electrode of FIG. 2a;

FIG. 3 is a schematic view of an electrochemical storage cell prepared by the process of the invention;

DETAILED DESCRIPTION OF THE INVENTION

Figure 1:
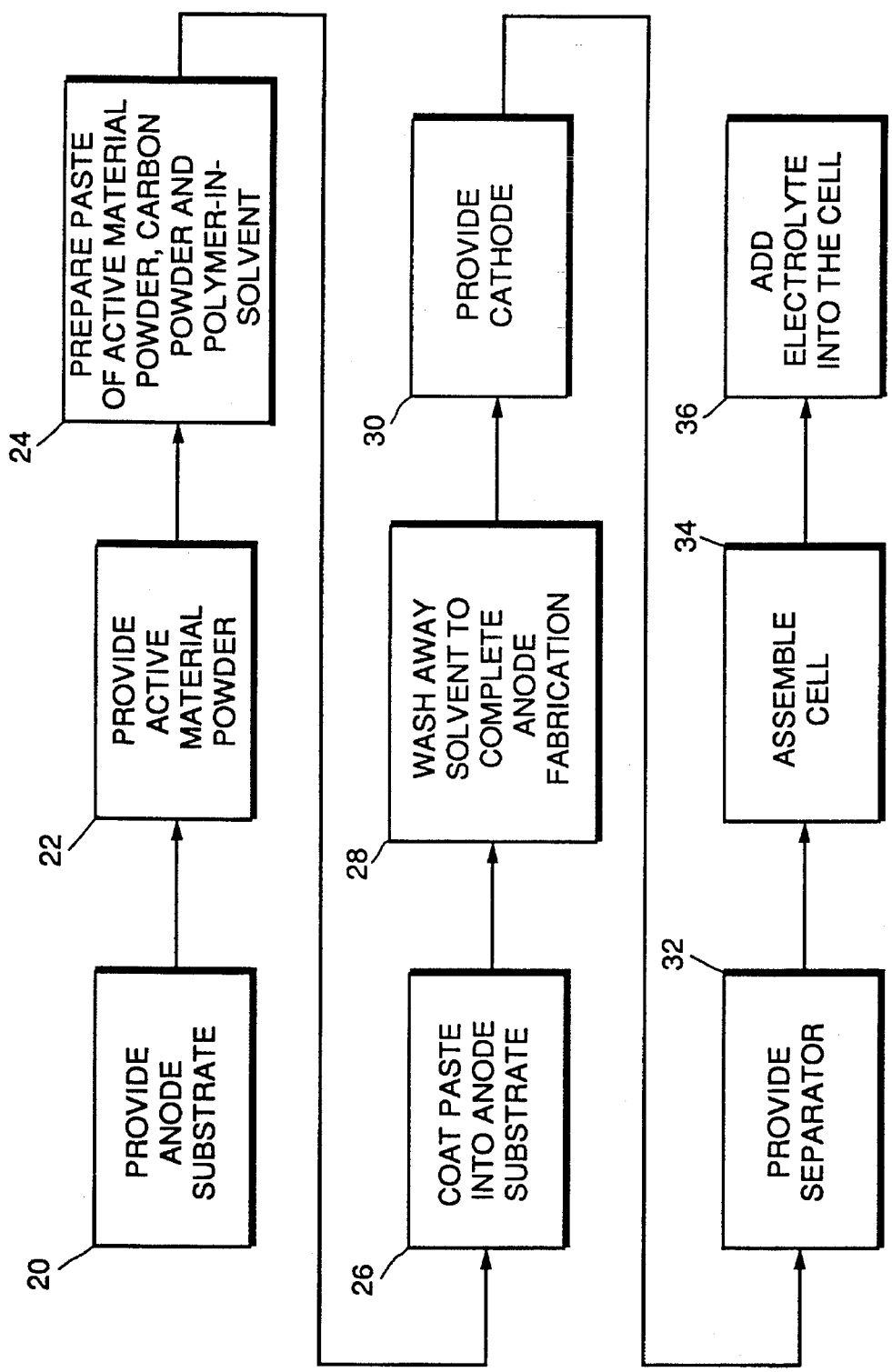
FIG. 1 is a method flow chart for the preparation of an electrochemical cell by the approach of the invention.

FIG. 1 depicts in block flow diagram form a preferred embodiment of the method for preparing the anode of the invention, and then preparing an electrochemical cell (and battery) utilizing the anode. FIGS. 2 show the resulting anode, and FIG. 3 the resulting electrochemical cell. The preparation of a cathode by the approach of the invention uses the same steps as illustrated in FIG. 1 and yields a structure like that of FIG. 2, except as will be discussed subsequently.

An electrode substrate is provided, numeral 20. The electrode substrate is preferably a highly porous, chemically inert, electrically conductive material having a large amount of surface area per unit volume of material and pores sufficiently large to allow easy penetration of the alloy particles in paste form. The anode substrate is also desirably somewhat compliant to partially absorb volumetric changes during charging and discharging of the electrochemical cell. In the preferred approach, the anode substrate is made of nickel in the form of a sponge similar in form and appearance to a conventional household sponge. The anode may also be made in the form of perforated material, felt, metal strands, metal mesh or other forms.

An active material is provided in a finely divided form, numeral 22. For the anode, the active material is preferably a hydride-forming metal. The active material is provided in finely divided form, preferably a powder having a particle size between about 30 and about 80 micrometers in diameter, is provided, numeral 22. This metal becomes the active material of the anode of the final electrochemical cell. For a metal M and metal hydroxide MHx, the reversible anode reaction is, in generalized form,

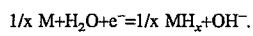
$1/x\ M+H_2O+e^-=1/x\ MH_x+OH^-$.

For this preferred embodiment, the hydride-forming metal must be of a material operable in this anode reaction. An example of a preferred metal is $La_{0.8}Ce_{0.2}Ni_{4.8}Sn_{0.25}$, provided as a powder having a size of from about 30 to about 80 micrometers. This alloy was prepared in an arc-melting furnace, by a homogeneous melting of the respective components.

Many other hydride alloy compositions are known in the art and are useful in the making of the metal anodes. Some examples follow: $LaNi_{5-x}Co_x$ (where x ranges from 0 to about 2); $MmNi_{5-x}Co_x$ (where x ranges from 0 to about 2 and Mm is a misch metal which is a mixture of rare earth metals); $La_{1-x}M_xNi_{5-y-z}Co_yM'_z$ (where x ranges from 0 to about 0.3, y ranges from 0 to about 2, z ranges from 0 to about 0.5, M is Nd or Tl, and M' is Al or Si); $MmNi_xCo_yMn_zAl_w$ (where x ranges from about 3 to about 5, y ranges from 0 to about 2, z ranges from 0 to about 0.7, and w ranges from 0 to about 0.6); $Tl_vZr_wV_xNi_yCr_z$ (where v and w are each about 0.16, x is about 0.22, y is about 0.39, and z is about 0.07).

When a cathode is prepared by the approach of the invention, the active material is preferably nickel oxyhydroxide/nickel hydroxide, typically indicated as $NiOOH/Ni(OH)_2$. The active material is provided in a finely divided form, as just discussed.

In either case, a paste is prepared, numeral 24. The paste is composed of a quantity of the active material, an optional quantity of a finely divided electrically conductive but chemically nonreactive material, and a solution of a polymer in an organic solvent. The finely divided electrically conductive but chemically nonreactive material serves to improve electrical conductivity between the active material and the electrode substrate. It is optionally present, to improve the electrical conductivity of the final structure in the event that the active material by itself has insufficient conductivity. In the preferred case, this material is a high-surface-area graphite or carbon powder. Preferably, the active material (the hydride-forming metal powder for the case of the anode and the $NiOOH/Ni(OH)_2$ for the case of the cathode) is present in an amount of from about 95 to about 100 parts by weight (most preferably from about 95 to about 97 parts by weight), and the carbon or other conductive material is present in an amount of from about 5 to about 0 parts by weight (most preferably from about 5 to about 3 parts by weight, so that some of the conductive material is present to aid in conduction by the structure).

These solid components are formed into a paste for application using a solution of a polymer dissolved in a water-miscible (soluble) organic solvent. Either of two combinations of polymer and solvent is preferred: (a) polybenzimidazole polymer in N,N-dimethylacetamide solvent or (b) polysulfone polymer N,N-dimethylformamide solvent. Desirably, from about 10 to about 15 parts by weight of the polymer in the solvent is used. The amount of solvent in the paste is sufficient to yield a paste of a desired viscosity. In a typical case, the resulting paste has a viscosity about like that of tooth paste.

A portion of the paste 60 is coated onto the electrode substrate 62, numeral 26. For a porous substrate, the coating procedure becomes an impregnation of the paste into the electrode substrate. In the case of the preferred nickel sponge substrate, care is taken to distribute the paste into the accessible pores of the spongy material.

The coated or impregnated substrate is immediately immersed into a pool of deionized water in order to wash out the organic solvent, numeral 28. The water wash also performs the important function of precipitating the polymer. The substrate is left in the water for a minimum of a half hour for complete washing of the solvent and polymer precipitation. As the solvent is washed out of the paste, the polymer fibrils deposit on the surface of the solid particles (the "polymer precipitation"), including the active material, inert conductive particles, and substrate material. The result is a mass of porous, wettable, flexible cages around the particles, with the cages interconnected to form a three-dimensional holding or bonding structure. The resulting structure is a resilient, long-lasting, particle-holding network. The electrode produced in this way has high rate capability and high utilization of the active material, because good accessibility of the active material surface by the electrolyte gives a high effective electrode surface area.

This approach to forming the electrode is to be contrasted with a hot melt polymer alternative approach to forming electrodes wherein an active material and an electrical conductor powder are mixed together with a polymer powder (and no solvent). The mixture is heated to soften the polymer, and the softened mixture is forced into the anode substrate. In this alternative approach, the polymer may not achieve full caging of the powders. The latter situation results in a structure which is susceptible to disintegration during volume changes accompanying charging and discharging and does not achieve full utilization of the active material. The active material can spall away from the substrate at later times during service, resulting in total or partial failure of the cell.

Another shortcoming of the alternative hot melt polymer approach is that the mass of softened polymer can block a portion of the surface area of the active material particles or completely encapsulate some fraction of the active material powders, rendering them ineffective and reducing the effectiveness and capacity of the electrode and the electrochemical cell. In the present approach, the thin coating of polymer on the active material and conductive particles is porous, so that the electrolyte in the electrochemical cell can penetrate to the surface of the metal particles.

Finally, in the alternative approach the mass of active material and conductive particles is relatively rigid due to the thick polymer coating. In the present approach the mass of active material and conductive particles is more compliant due to the thin precipitated polymer coating. This compliancy, coupled with the compliancy of the electrode substrate, aids in accommodating the volumetric change that occurs during the charging and discharging periods of the electrochemical cell. (The anode reaction presented above results in the volume change, inasmuch as the specific volume of the metal M is, in general, smaller than the specific volume of the metal hydride MHx.)

Electrode fabrication by direct sintering, another technique that is available for use in the case of some sinterable active materials, is also quite distinct. Direct sintering requires that the mass of powders be heated to an elevated sintering temperature. The use of such high temperatures can adversely affect the performance of the active material.

Returning to the discussion of the fabrication procedure of the invention, at this point of the processing a first electrode, here the anode electrode 40, is complete. Such an electrode is shown in FIGS. 2a and 2b. This anode is fabricated in an inexpensive manner by the approach just discussed. The remaining steps in FIG. 1 illustrate the fabrication of an electrochemical cell (FIG. 3) which incorporates the anode 40.

A second electrode, here illustrated as the cathode 44, is provided, numeral 30. The cathode 44 is prepared in any operable manner. In a most preferred approach, the second electrode is prepared by the approach just disclosed, except that the active material is a cathode material such as NiOOH/Ni(OH)$_2$. In another approach not within the scope of the invention, a typical nickel oxide/hydroxide cathode is prepared by impregnation of Ni(OH)$_2$ in the pores of a porous nickel substrate either by a chemical or an electrochemical means from a nickel nitrate solution containing about 5 to 10 percent of cobalt nitrate solution. A preferred cathode active material made by this approach contains about 5 to 10 percent of cobalt of the total of nickel and cobalt. In the electrochemical cell, regardless of its mode of fabrication, this cathode functions according to the reversible reaction

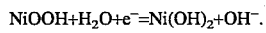
$$NiOOH + H_2O + e^- = Ni(OH)_2 + OH^-.$$

A separator 46 is provided, numeral 32. The separator 46 is prepared in any operable manner. The separator material is an electrically nonconductive porous material that isolates cathodes from anodes electrically to avoid shorts, yet retains a sufficient amount of electrolyte to form an electrochemical cell. The separator material must have the following additional characteristics. It should be sufficiently stable chemically in the alkaline battery electrolyte to last throughout the service lifetime without producing a detrimental deleterious effect by its reaction products. It should retain a sufficiently large amount of electrolyte to provide a good ionic conductivity through the separator. For an electrolyte starved sealed cell, the separator should have a sufficient amount of large pores which are not filled with electrolyte for oxygen gas to pass from the cathode to the anode to achieve a good oxygen recombination capability. The oxygen is evolved from the cathode during the overcharge of the cell as an undesirable by-product of charging the cathode. Operable separators are commercially available nylon or polypropylene felt materials having a thickness of about 150 to about 250 micrometers and which are typically made of monofilament polymer fiber of about 20 micrometers or less in diameter. A preferred separator material, provided that cost is less important than performance, such as for spacecraft applications, is a woven zirconia fabric mechanically reinforced with a polymer, which has superior electrolyte retention to the organic felt material.

The anode 40, cathode 44, and separator 46 are assembled together, numeral 34, with the separator between the anode and the cathode, to form a basic storage unit 42. Considering the above-indicated anode and cathode reactions, the electrochemical cell operates according to the reversible reaction

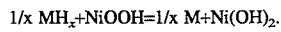
$$1/x\ MH_x + NiOOH = 1/x\ M + Ni(OH)_2.$$

Each such basic storage unit 42, when immersed into an electrolyte, exhibits a characteristic voltage, capacity, and current flow. To obtain higher voltages, capacities, and current flows, more than one such basic storage unit 42 is used. FIG. 3 depicts several basic storage units 42 connected in parallel in an electrochemical storage cell (or battery) 47.

The storage units 42 are placed into a container 48, and an electrolyte 50 is added, numeral 36. A preferred alkali electrolyte is a 20–40 percent, more preferably a 26–31 percent, and most preferably a 31 percent, aqueous solution of potassium hydroxide (KOH). The previously discussed polymers used in the preparation of the anode 40 exhibit long-term stability in such an electrolyte solution.

The following examples illustrate aspects of the invention. They should not be interpreted as limiting of the invention in any respect.

EXAMPLE 1

Three test anodes were fabricated, each using about 1.1 grams of the hydride-forming metal alloy $La_{0.8}Ce_{0.2}Ni_{4.8}Sn_{0.25}$ and the preferred fabrication techniques discussed previously. The anodes had about 1 square inch of surface area. Test cells were prepared by sandwiching the respective test anodes between two sets of separators and nickel oxide electrodes, and immersing the cells into a 31 percent aqueous solution of KOH, thereby forming a Ni/MHx electrochemical cell.

These electrodes had measured storage capacities of about 300–320 mAh/g (milliampere hours per gram) of the metal alloy. In a separate measurement it was determined that the anodes had a gaseous hydrogen absorption capacity of about 335 mAh/g. The close correspondence of the storage capacity and the hydrogen absorption capacity indicated that the metal active material had a high utilization of about 93 percent, a desirable feature of the storage cell.

The gravimetric and volumetric energy densities of this type of cell are projected to be about 30 percent greater than for an otherwise comparable Ni/Cd cell. Moreover, cadmium is a material that is environmentally hazardous, while the present cell utilizes no such hazardous material. The Ni/MHx cell will therefore be preferred to a Ni/Cd cell for many applications.

EXAMPLE 2

Figure 4:
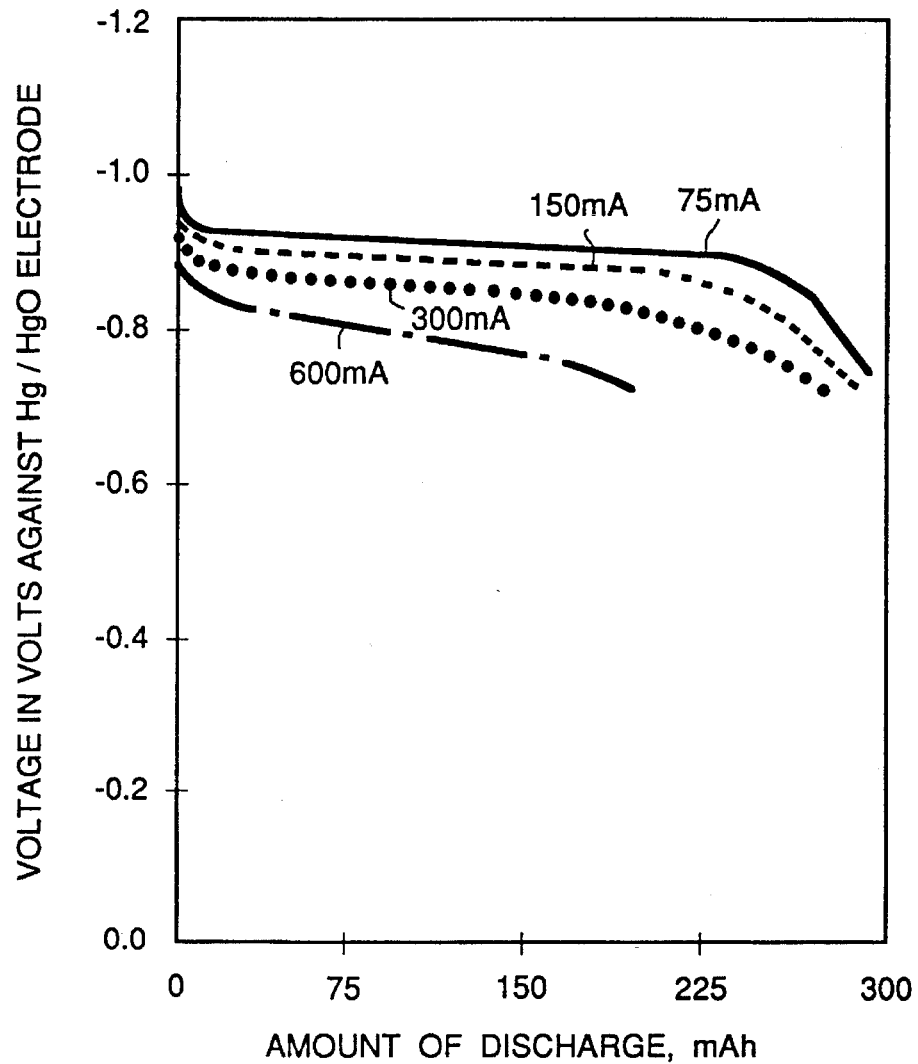
FIG. 4 is a graph of voltage loss as a function of amount of discharge, for various current flows, for an anode made according to the invention.

Cells fabricated in the same manner as in Example 1 were fully charged and studied during discharge at various discharge rates. FIG. 4 illustrates the discharge behavior in terms of the output voltage as a function of amount (degree) of discharge, for various discharge rates. There is a relatively small voltage loss as a function of both the amount of discharge and the rate of discharge. These characteristics are generally as good as, or better than, a high performance cadmium electrode for an aerospace Ni/Cd cell.

EXAMPLE 3

Figure 5:
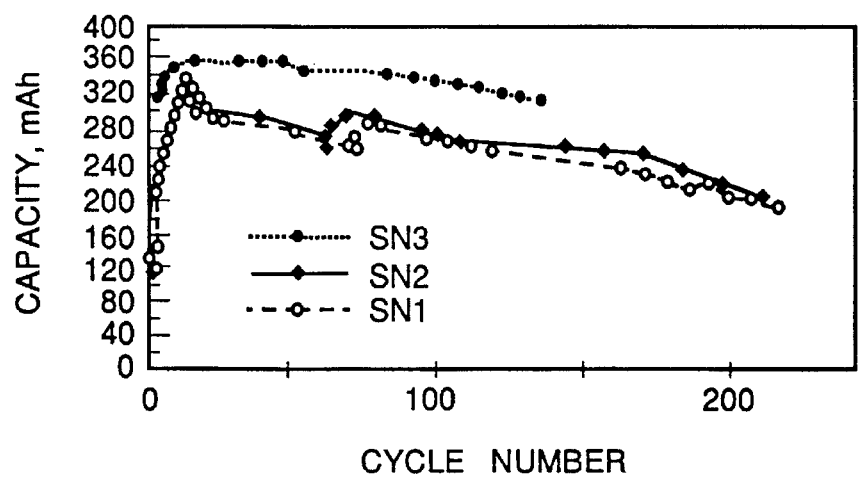
FIG. 5 is an electrochemical cell storage capacity as a function of number of charge/discharge cycles for electrochemical cells made according to the invention.

The three cells prepared for Example 1 were subjected to repeated cycles of charging and discharging. The capacity of the cells was measured every few cycles. FIG. 5 shows the capacity as a function of number of cycles for the three cells. After an initial breakin period, there is a slow decrease in the storage capacity. Again, the reduction is comparable with, or less than, that experienced for cadmium electrodes used in Ni/Cd cells. There is no catastrophic reduction in cell properties due to disbonding of active material or other mechanism.

The present approach provides an advance in the art of electrochemical storage cells. The storage cell of the invention is inexpensively produced, has excellent charging and discharging characteristics, and is resistant to degradation mechanisms. Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method of preparing an electrode comprising the steps of:
   providing a substrate;
   providing a hydride-forming metal alloy active material in a powdered form;
   preparing a paste comprising a mixture of the active material and a solution of a polymer in a water soluble organic solvent;
   coating the paste onto the substrate; and
   bonding the coated paste to the substrate comprises the step of
      washing away the organic solvent with water which precipitates the polymer such that the polymer deposits on solid particles of the active material and substrate material to form an interconnected porous holding structure around the particles.

2. The method of claim 1, wherein the step of preparing a paste includes the step of
   mixing the active material with a powdered electrically conductive but chemically nonreactive material in the solution of a polymer in an organic solvent.

3. The method of claim 2, wherein the step of preparing a paste includes the step of
   providing carbon powder as the electrically conductive but chemically nonreactive material.

4. The method of claim 2, wherein the step of preparing a paste includes the step of
   mixing from about 95 to about 97 parts by weight of the active material with from about 5 to about 3 parts by weight of the electrically conductive but chemically nonreactive material.

5. The method of claim 1, wherein the step of providing a substrate includes the step of
   providing a substrate made of nickel.

6. The method of claim 1, wherein the step of providing a substrate includes the step of
   providing a substrate having the form of a sponge.

7. The method of claim 1, wherein the step of providing an active material includes the step of
   providing $NiOOH/Ni(OH)_2$ in powdered form.

8. The method of claim 1, wherein the step of preparing a paste includes the step of
   providing a solution of a polymer in an organic solvent selected from the group consisting of (a) polybenzimidazole polymer in N,N-dimethylacetamide solvent and (b) polysulfone polymer in N,N-dimethylformamide solvent.

9. An electrode prepared by the method of claim 1.

10. A method of preparing an electrochemical storage cell, comprising the steps of:
    preparing a first electrode by the steps of:
       providing a first electrode substrate,
       providing a hydride-forming metal alloy active material in a powdered form,
       preparing a paste comprising a mixture of the active material and a solution of a polymer in a water soluble organic solvent,
       coating the paste onto the first electrode substrate, and
       bonding the coated paste to the substrate comprising the steps of:
          washing away the organic solvent with water which precipitates the polymer such that the polymer deposits on solid particles of the active material and substrate to form an interconnected porous holding structure around the particles;

providing a second electrode;

providing a separator;

assembling a cell having the separator between the first electrode and the second electrode; and providing an electrolyte to the cell.

11. The method of claim 10, wherein the step of preparing a paste includes the step of mixing the active material, with a powdered electrically conductive but chemically nonreactive material in the solution of a polymer in an organic solvent.

12. The method of claim 11, wherein the step of preparing a paste includes the step of providing carbon powder as the electrically conductive but chemically nonreactive material.

13. The method of claim 11, wherein the step of preparing a paste includes the step of mixing from about 95 to about 97 parts by weight of the active material with about 5 to about 3 parts by weight of the electrically conductive but chemically nonreactive material.

14. The method of claim 10, wherein the step of providing a substrate includes the step of providing a substrate made of nickel.

15. The method of claim 10, wherein the step of providing a substrate includes the step of providing a substrate having the form of a sponge.

16. The method of claim 10, wherein the step of providing an active material includes the step of providing $NiOOH/Ni(OH)_2$ in powdered form.

17. The method of claim 10, wherein the step of providing an electrolyte includes the step of providing an electrolyte comprising an aqueous solution of KOH.

18. The method of claim 10, wherein the step of preparing a paste includes the step of providing a solution of a polymer in an organic solvent selected from the group consisting of (a) polybenzimidazole polymer in N,N-dimethylacetamide solvent and (b) polysulfone polymer in N,N-dimethylformamide solvent.

19. A storage cell prepared by the method of claim 10.

* * * * *